UNITED STATES PATENT OFFICE.

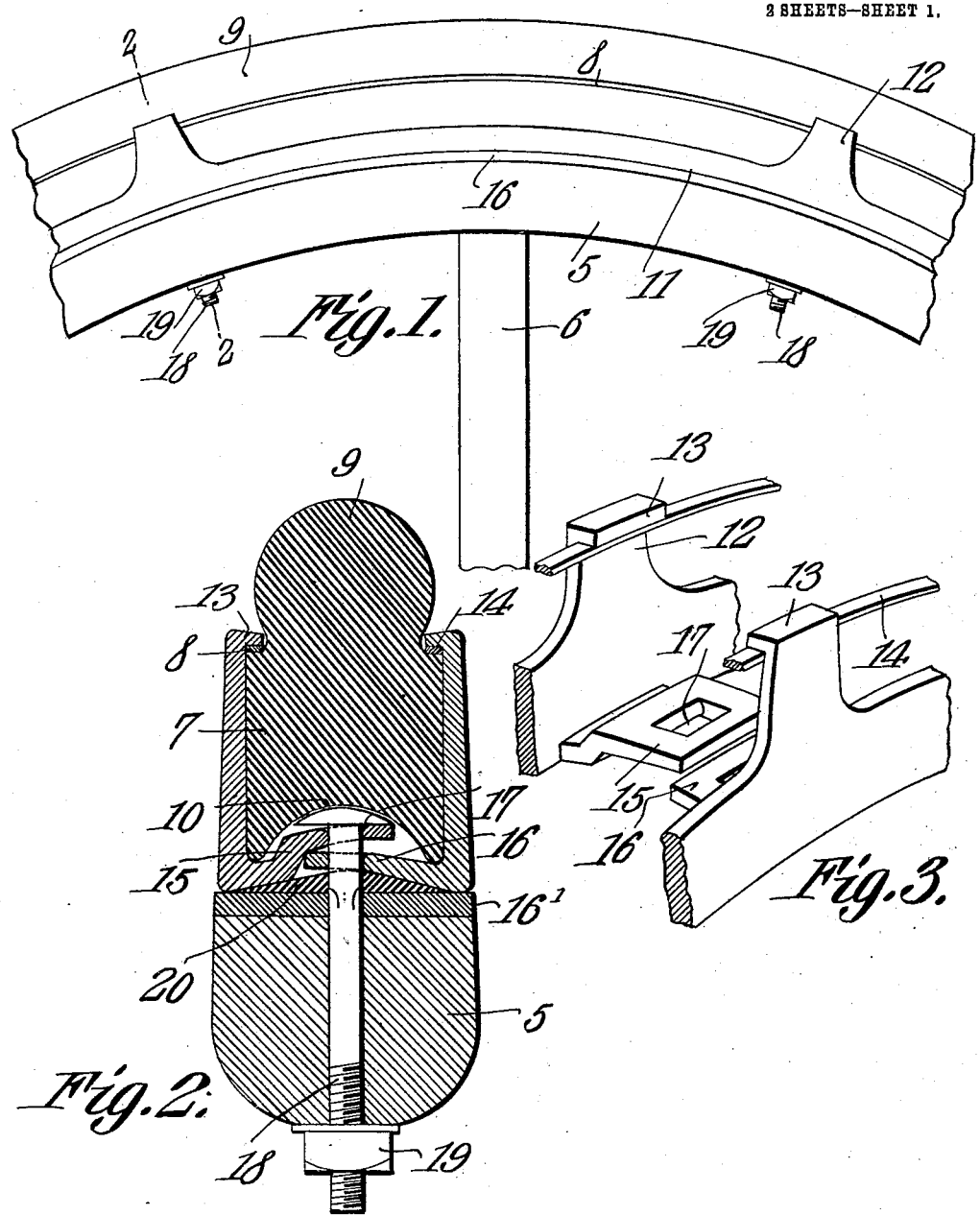

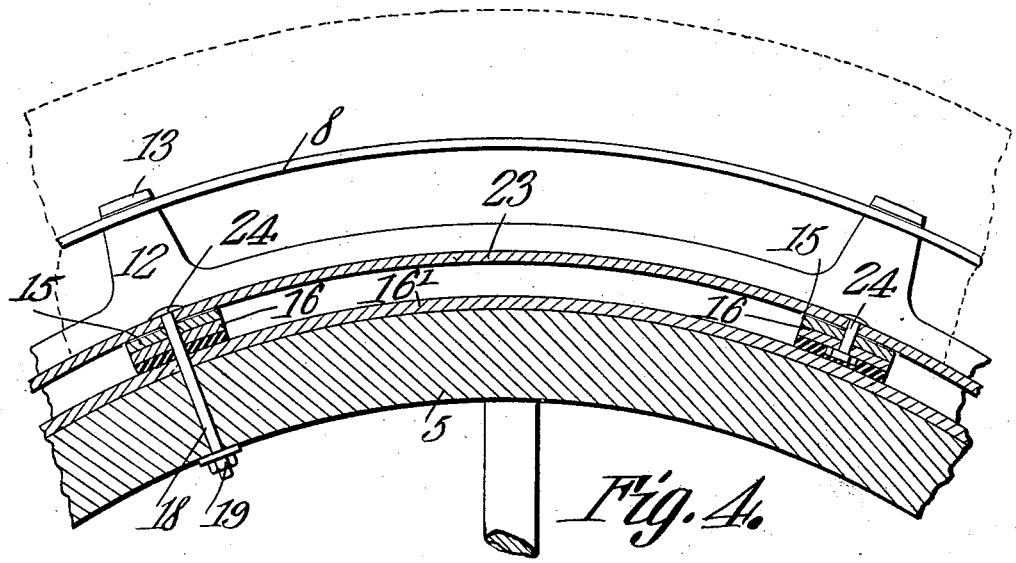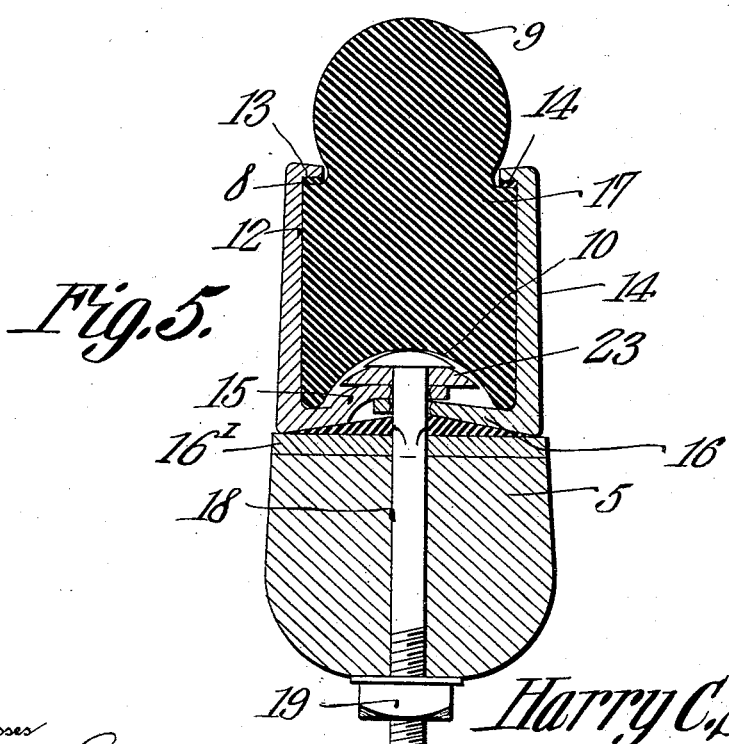

HARRY C. SMITH, OF AINSWORTH, NEBRASKA.

ADJUSTABLE RIM AND TIRE.

969,416.  Specification of Letters Patent.  Patented Sept. 6, 1910.

Application filed May 28, 1909. Serial No. 498,855.

*To all whom it may concern:*

Be it known that I, HARRY C. SMITH, a citizen of the United States, residing at Ainsworth, in the county of Brown and State of Nebraska, have invented a new and useful Adjustable Rim and Tire, of which the following is a specification.

The object of the present invention is to provide an improved construction of vehicle wheel and the improvements are directed more particularly to the structure of the rim or tire receiving portion of the wheel, the object in view being to provide for a positive clamping of a tire to the wheel and to permit of its ready removal therefrom.

A further object of the invention is to provide, in a vehicle wheel structure, means which may be adjusted to grip a tire more or less firmly as may be desired, or in other words to provide adjustable means for gripping a tire, such means being readily accessible and of simple construction.

Further, the invention aims to provide a tire gripping means which will engage continuously with a tire being gripped thereby so that there will be no tendency for any portion of the tire to spring away from the periphery of the wheel.

It is a further object of the invention to so construct the means for adjusting the tire-engaging means that the same will hold the tire engaging means in place upon the wheel felly without the employment of any separate or additional securing devices, and further to construct such adjusting means so that it will extend through the tire engaging means in a radial direction whereby to positively draw the said tire engaging means against the periphery of the wheel and therefore hold it more firmly in position than were the ordinary transverse securing bolts or other means employed.

In the accompanying drawings, Figure 1 is a view in side elevation of a portion of a vehicle wheel showing the application of the present invention thereto, Fig. 2 is a vertical transverse sectional view in detail through the said wheel on the line 2—2 of Fig. 1, Fig. 3 is a perspective group view of opposite portions of the tire gripping members, and Fig. 4 is a longitudinal sectional view through a portion of the wheel rim embodying the present invention showing a slight modification, and Fig. 5 is a transverse sectional view in detail illustrating also this modification.

In the drawings, there is shown a portion of a vehicle wheel of which the felly is indicated by the numeral 5 and the spokes by the numeral 6, and there is also shown, upon this wheel, a tire 7 having at each side an annular shoulder 8 and having between the said shoulders a rounded or transversely convexed tread portion 9, the inner periphery of the tire being grooved as indicated by the numeral 10 for a purpose which will be presently explained.

The means, embodied in the present invention, for holding the tire 7 in position upon the felly 5, is embodied in a pair of annular members 11 disposed at their inner peripheral edges against the outer peripheral surface of the felly 5 or more specifically speaking, the tire thereon. Each of the members 11 above referred to is formed at intervals with radially extending tire engaging portions 12, it being understood of course that these portions project, as stated radially, beyond the outer peripheral edge of their respective members 11 and the extremities of these portions are bent to extend inwardly at right angles as at 13 and the said portions of the two members 11 are oppositely located when the members are in proper position upon the wheel felly.

As is clearly illustrated in Fig. 2 of the drawings, the inwardly bent terminals 13 of the tire engaging portions of the members 11 seat upon the shoulders 8 of the tire 7 whereby to retain the tire in position against the felly of the wheel, and in order that the portion of the tire intermediate of the tire receiving portion 12 may not be permitted to spring away from the wheel felly, an annular band or strip 14 is carried by the inwardly bent terminals 13 of the said portions 12 of each member 11 and seats also upon the corresponding shoulder 8 of the tire 7, it being of a diameter equal to the diameter of the tire and its said shoulder. It will be understood of course that these bands 14 are continuous and that they retain the tire 7 in position as firmly and securely as if the tire engaging portion 12 were continuous.

It is contemplated that the two tire gripping members 11 shall be secured upon the felly of the wheel and that securing means for holding them in place shall be capable of adjustment to rock the members toward each other whereby to grip a tire disposed between them, more or less firmly, and in order that the said members 11 may be so connected, each of the members is formed at its lower edge at a point corresponding to the point of location of the tire gripping portion 12, with inwardly laterally right angularly extending tongues, which, upon one of the members, are indicated by the numeral 15 and upon the other member by the numeral 16. The tongues 15 are off-set upwardly to a slight degree as clearly shown in the drawings, and the tongues 16 project beneath the off-set portion of the respective tongues 15, both tongues being formed each with an aperture 17 for the passage of a bolt 18 having threaded upon its inner end a nut 19, the said bolt extending through a bolt opening formed radially through the felly 5 of the wheel, and the nut 19 bearing against the inner periphery of the felly. As will be observed from an inspection of the drawings, the tongues 15 and 16 are extended, generally speaking, in a curve from end to end and these curves are relatively eccentric so that the tongues 15 will not lie flat upon the tongues 16 but will extend in spaced relation with respect thereto except at that part at which the extreme ends of the tongues 16 contact with the under side of the off-set portion of the said tongues 15, so that when the bolt is tightened the off-set end of the tongues 15 will be drawn downwardly thereby serving to rock both of the members 11 in a direction toward each other, and to bring them firmly into engagement with the tire 17 disposed between them. It will further be observed that the edges of the openings 17 in the tongues of the two tire gripping members 11 are convexed so that while these openings are no wider than the diameter of the bolt 18, the said tongues may rock upon the bolt without binding thereon within certain limits of course.

It is preferable that there be interposed between the tongues 15 and 16 of the tire gripping members 11 and the outer peripheral surface of the felly or the rim thereon, a washer 20 which is of rubber and may be either continuous or circular in which latter instance one is disposed upon each of the bolts 18 in the relation stated. This washer or the washers if several are employed, permit of the tire gripping members being drawn firmly into gripping engagement with the tire and yet obviate momentary relative displacement of the members upon pressure being exerted against the tire opposite any one pair of tongues, and furthermore obviate the contact of the tongues, except at their outer ends, with the metallic tire upon the felly of the wheel. It will be observed that the groove 10 in the inner peripheral surface of the tire 7 receives and houses the heads of the bolts 18, and the off-set portion of the tongues 15.

It is at times desired to apply the tire clamping members and tire embodying the present invention to a vehicle wheel in which the ordinary fixed rim, indicated in Figs. 1 and 2 of the drawings by the numeral 16', is held upon the felly only by a few bolts located at intervals around the periphery of the wheel and when such application is to be made of the invention, bolts are passed through the tongues 15 and the bolt openings in the felly but it is expedient however that the tongues 15 which are located between the points of location of the bolts be also connected and there is therefore provided a supplemental rim or band indicated in Figs. 4 and 5 of the drawings by the numeral 23 and through this band, which band overlies the upper tongues 15, and the said tongues, where such tongues occur between the points of location of the beforementioned bolts, there are passed short bolts 24 which serve the same function as do the bolts 18 although they do not pass through the felly 5 of the wheel.

What is claimed is:—

1. In a device of the class described, co-operating tire gripping members, oppositely off-set overlapping tongues carried by the members, and means passing through the tongues and capable of adjustment whereby to rock the members to bring their tire gripping portions into gripping engagement with a tire.

2. In a device of the class described, the combination with a wheel, of tire gripping members disposed against the periphery of the wheel, the said members having overlapping tongues extending across the periphery of the wheel but normally spaced therefrom, and means passing through the said tongues of the members and through the felly of the wheel and capable of adjustment whereby to rock the members to bring their tire gripping portions into gripping engagement with a tire.

3. In a device of the class described, the combination with a vehicle wheel, of co-operating tire gripping members disposed against the periphery of the wheel and having laterally offset tongues overlapping and extending in spaced relation with respect to the said periphery of the wheel, the said tongues being also relatively angularly disposed, and means passing through the tongues and through the felly of the wheel whereby the members may be rocked to bring their tire gripping portions into gripping engagement with a tire.

In testimony that I claim the foregoing as my own, I have hereto affixed my signature in the presence of two witnesses.

HARRY C. SMITH.

Witnesses:
CHARLES F. HOWE,
LEANDER E. GOULD.